(No Model.)
A. J. SANDS.
COUPLING AND VALVE FOR WATER OR GAS MAINS.
No. 499,043. Patented June 6, 1893.
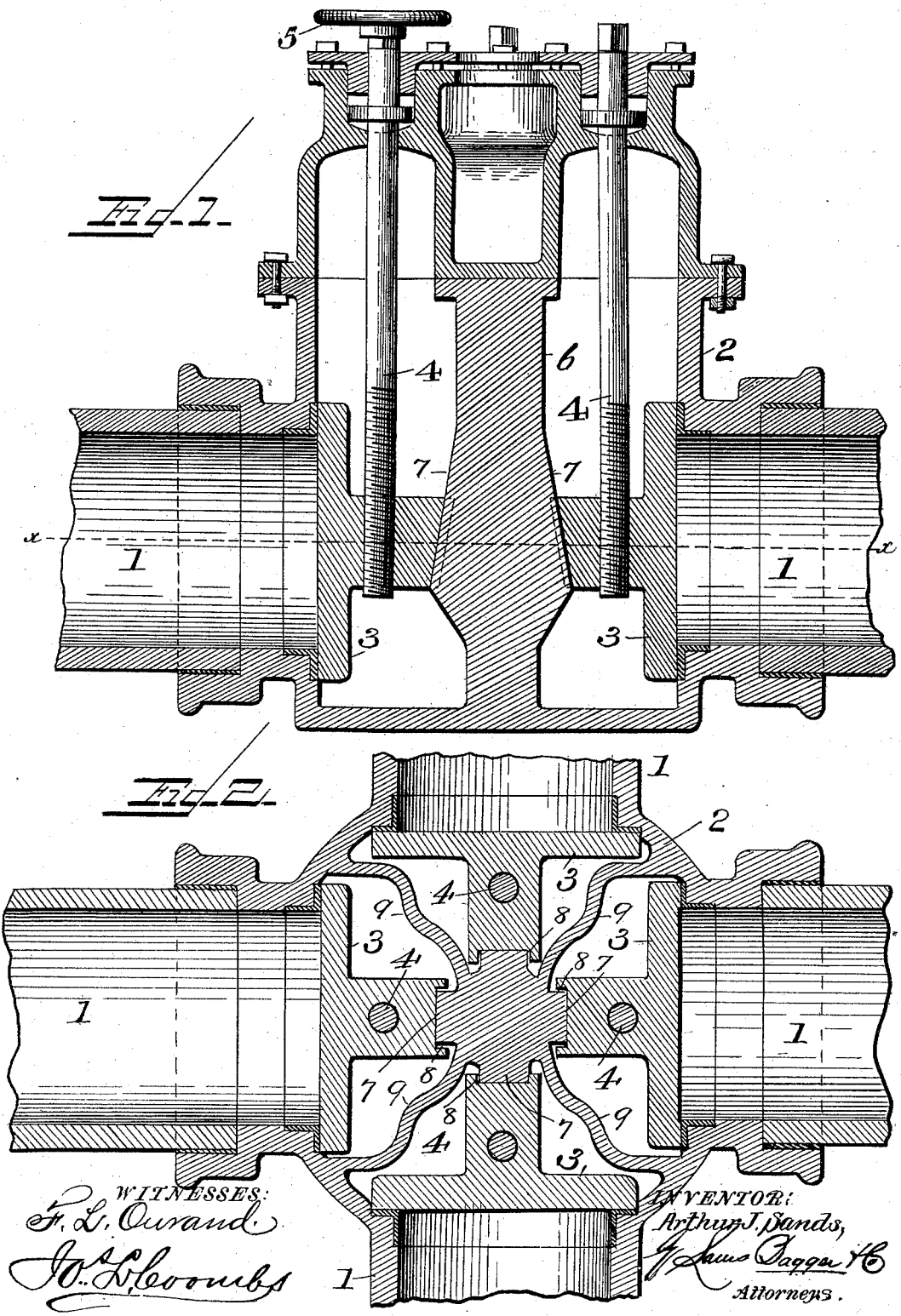

UNITED STATES PATENT OFFICE.

ARTHUR J. SANDS, OF SCHENECTADY, NEW YORK, ASSIGNOR OF ONE-HALF TO EDGAR D. JOYNER, OF SAME PLACE.

COUPLING AND VALVE FOR WATER OR GAS MAINS.

SPECIFICATION forming part of Letters Patent No. 499,043, dated June 6, 1893.

Application filed February 14, 1893. Serial No. 462,305. (No model.)

*To all whom it may concern:*

Be it known that I, ARTHUR J. SANDS, a citizen of the United States, and a resident of Schenectady, in the county of Schenectady and State of New York, have invented certain new and useful Improvements in Couplings and Valves for Water or Gas Mains; and I do hereby declare that the following is a full, clear, and exact description of the invention, which will enable others skilled in the art to which it appertains to make and use the same, reference being had to the accompanying drawings, which form a part of this specification.

My invention relates to improvements in couplings and valves for street water, gas or other mains, generally used at street crossings where different mains intersect each other. In the ordinary construction of such couplings, each intersecting main is provided with a separate valve-casing and valve, which are located at some distance from each other, thus necessitating an opening in the street for each valve.

The object of my invention is to provide an improved coupling for the mains, which also forms the casing of the valves, whereby I secure superior advantages with respect to economy and efficiency.

The invention consists in the novel construction hereinafter described and claimed.

In the accompanying drawings: Figure 1 is a longitudinal sectional view of a coupling constructed according to my invention. Fig. 2 is a horizontal section of the same, on the line *x—x*, Fig. 1.

In the said drawings, the reference numeral 1 indicates four mains or pipes running at right angles to each other, and 2 a coupling with which said mains are connected and communicate with. In this coupling are located four separate and independent valves 3, one for each main, and each provided with a valve-stem 4, and operating-wheel 5.

Formed integral with the casing and in the center thereof, is a vertical standard 6, having a series of beveled portions 7, forming inclines, corresponding in number with the valves employed. These inclines engage with beveled grooves 8, in the inner faces of the valves, whereby the latter are guided in their movement and forced firmly against their seats when closed. This standard is also provided with radial strengthening or bracing ribs or webs 9, formed integral therewith and with the casing. From this construction it will be seen that any of said valves can be operated independently of the others to open or close the main with which it is connected to open or cut off the supply to the couplings, and as a single central standard forms an abutment for all the valves, the cost of the couplings is greatly reduced and the construction simplified. This device also requires but one opening or well hole in the street for all the valves, whereas in the ordinary forms of couplings a separate well hole is required for each valve.

While I have illustrated four mains as being in communication with the coupling, it is obvious that more or less may be employed, without departing from my invention.

Having thus described my invention, what I claim is—

1. A coupling for street mains having a series of independent valves and a central standard forming an abutment for all the valves, substantially as described.

2. A coupling for street mains having a series of openings to communicate with the mains, a series of independent valves for said openings, formed on their inner ends with beveled grooves, a single central standard having inclines engaging with said grooves, and screw threaded valve rods connected with said valves, substantially as and for the purpose specified.

In testimony that I claim the foregoing as my own I have hereunto affixed my signature in presence of two witnesses.

ARTHUR J. SANDS.

Witnesses:
EVERETT SMITH,
D. CADY SMITH.